March 10, 1942. E. F. STUMPF 2,276,000
CONTINUOUS POWER TAKE-OFF DRIVE
Filed June 20, 1940
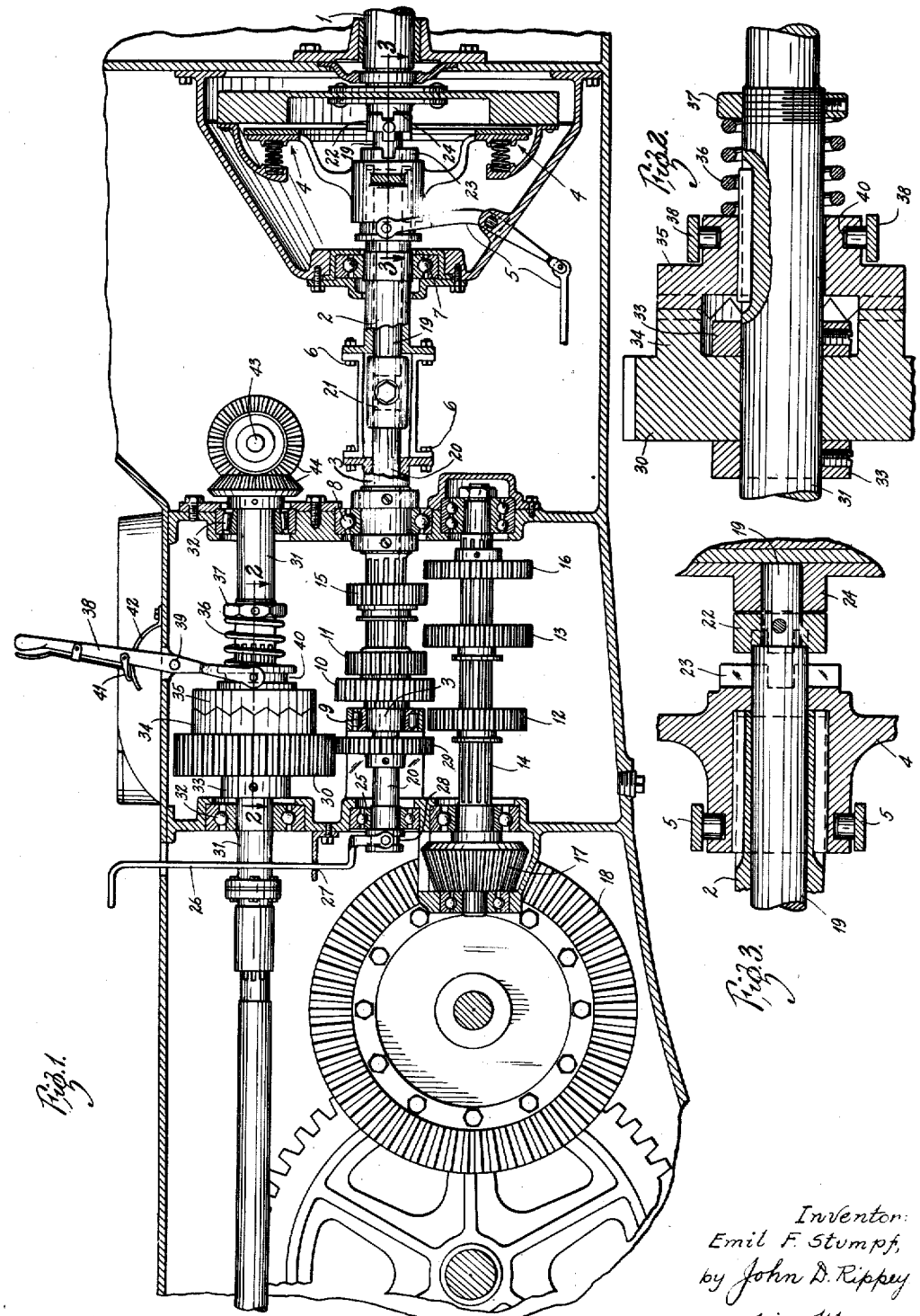
Inventor:
Emil F. Stumpf,
by John D. Rippey
his Attorney.

Patented Mar. 10, 1942

2,276,000

UNITED STATES PATENT OFFICE 2,276,000

CONTINUOUS POWER TAKE-OFF DRIVE

Emil F. Stumpf, Valmeyer, Ill.

Application June 20, 1940, Serial No. 341,427

18 Claims. (Cl. 74—11)

This invention relates to a continuous power take-off drive; and has special reference to mechanism for continuously operating power-driven machinery pulled by a tractor irrespective of whether the tractor is traveling or not.

An object of the invention is to provide improved mechanism for driving the power-driven machinery pulled by a tractor uninterruptedly when the tractor is stopped, and means whereby operation of said mechanism may be stopped at the same time that the tractor is stopped.

This invention is specially designed and adapted for use in tractors for operating combines and other machinery by the tractor motor. No motor is needed on a combine pulled by a tractor having this invention embodied therein because this invention provides for driving the combine continuously by the tractor motor while starting and stopping the tractor itself. In combine harvesting and threshing, it becomes necessary at times to stop the tractor or to drive slowly, and, when the combine machinery is driven by a take-off shaft that stops when disengaging the engine or motor clutch, the separating machinery of the combine will not function efficiently when it is full of unthreshed grain. By use of this invention, the threshing machinery can be continuously operated from the tractor engine or motor irrespective of whether the clutch for driving the tractor is engaged or disengaged.

Another object of this invention is to provide a pair of coaxial shafts one of which is the transmission shaft of the tractor, and the other a power take-off shaft having a toothed clutch by which it can be driven directly by the engine shaft or, by shifting said clutch, by the transmission shaft, thus making it possible to operate a combine or other machinery continuously irrespective of whether the transmission shaft of the tractor is rotating or not, and also to rotate both of said shafts as one unit.

Another object of the invention is to equip the take-off shaft with an improved escapement clutch whereby operation of the take-off shaft may be controlled or stopped at the will of the operator, and functioning also as a safety device to enable the machinery driven by the take-off shaft to stop when it becomes overloaded, and also capable of operation in ordinary gear grease as distinguished from usual plate or friction clutches.

Various other objects and advantages of the invention will be apparent from the following description, reference being made to the annexed drawing, in which—

Fig. 1 is a side elevation of my improved take-off drive, certain of the supporting parts and bearings thereof being in section.

Fig. 2 is an enlarged sectional view approximately on the line 2—2 of Fig. 1.

Fig. 3 is an enlarged detail sectional view approximately on the line 3—3 of Fig. 1.

The tractor engine shaft 1 is arranged to drive the tubular sectional transmission shaft comprising the forward section 2 and the rear section 3 through the usual clutch device 4 conventionally shown and which may be engaged and disengaged by connections 5. This clutch device is of known arrangement and operation, and many of the specific details thereof are omitted from the drawing. It is of the type contained in present "Oliver" tractors. The two sections 2 and 3 of the tubular transmission shaft are connected by a splice comprising removable and replaceable fasteners 6. The shaft section 2 is journalled in an anti-friction bearing 7 and the shaft section 3 is journalled in anti-friction bearings 8 and 9. The tractor includes variable speed transmission gearing comprising gears 10 and 11 attached to the shaft section 3 adapted to be engaged and disengaged, respectively by shiftable gears 12 and 13 splined for sliding movements on and along a shaft 14; and a gear 15 splined for sliding movements on and along the shaft section 3 for engagement with and disengagement from a gear 16 attached to said shaft 14. The shiftable gears 12, 13 and 15 may be shifted optionally by the usual connections provided for that purpose to control the speed of the tractor. A gear 17 rigid on the shaft 14 meshes with a gear 18 for driving the differential gearing by which the tractor is operated in the usual manner.

My invention is associated with the tractor mechanism already described. A jointed shaft comprising a forward section 19 and a rear section 20 is mounted within the tubular shaft composed of the two sections 2 and 3 and is coaxial therewith. The sections 19 and 20 are attached by a releasable coupling 21. The forward end of the section 19 is beyond the forward end of the tubular shaft section 2 within which it is mounted. I provide a clutch element 22 which is rigidly attached to the forward end of the shaft section 19 and is shiftable by longitudinal movements of the inner shaft into and out of clutching engagement with the cooperating clutch portion 23 rigid with the forward end of the shaft section 2; and is also movable into and out of clutching engagement with a clutch element 24 rigid with the shaft 1. When the clutch element 22 is in engagement with either of the clutch elements 23 or 24, it is out of engagement with the other.

The inner shaft section 20 extends rearwardly beyond the tubular shaft 3 within which it is journalled for relative rotation, and has its rear end supported in an anti-friction bearing 25. A shift lever 26 connected with a fulcrum 27 has its lower bifurcated end engaging in a circumferential groove 28 in the rear end of the shaft section 20, and is conveniently operative by the driver of the tractor from his usual seat to shift the inner shaft 19, 20, longitudinally to engage the clutch element 22 with the clutch element 23 or with the clutch element 24, as desired. When the clutch elements 22 and 23 are engaged, the inner shaft 19, 20 will be driven only by the transmission shaft 2, 3 of the tractor and when the tractor is in motion. When the clutch elements 22 and 24 are engaged and the clutch 4 is disengaged, the inner shaft 19, 20 will be driven directly by the engine shaft 1 while the tractor remains stationary. When the clutch elements 22 and 23 are engaged, the speed of rotation of the shaft 19, 20 is the same as that of the transmission shaft 2, 3. However, when the clutch elements 22 and 24 are engaged, the speed of travel of the tractor may be regulated by the variable speed gearing above described without affecting the speed of rotation of the take-off drive including the inner shaft 19, 20. As a consequence, the take-off drive and the machinery operated thereby may be driven at any desired speed irrespective of the speed of travel of the tractor or whether the tractor is traveling or not. With this double clutching device, it is possible for the operator to stop the tractor during continuous operation of the machinery driven by the tractor, or to stop the tractor and said machinery at the same time by disengaging the clutch device 4.

A gear 29 is attached to the rear end of the shaft 20 beyond the shaft 3, and is in constant mesh with a gear 30. The gear 29 is constantly engaged with the gear 30 in all axial adjustments of the shaft 20. The gear 30 is loosely mounted on a rotary power take-off shaft 31 journalled for rotation in anti-friction bearings 32 parallel with the shafts 3 and 20. Collars 33 adjustably attached to the shaft 31 prevent longitudinal displacement of the gear 30 along the shaft 31 and leave said gear free to rotate while said shaft remains stationary. The gear 30 is formed with a dental slip clutch member 34 adapted to be engaged by a complementary overload release clutch member 35 splined to the shaft 31 for sliding movements along said shaft. A spring 36 is mounted on the shaft 31 at one side of the clutch member 35 and having its opposite end engaging a collar 37 screwed on said shaft for movement to different positions to vary the tension of the spring 36. The spring 36 functions to hold the clutch member 35 in yielding engagement with the clutch member 34 and to rotate the shaft 31. A lever 38 mounted on a pivot 39 has one end engaging in a circumferential groove 40 formed in the hub of the clutch member 35, and its opposite end constituting a handle for manual engagement to operate said lever.

A pawl 41 pivoted on the lever 38 is arranged to engage the abutment 42 when the lever 38 is in position to hold the clutch member 35 disengaged from the member 34 in opposition to the power of the spring 36. When the clutch members 35 and 34 are held disengaged in this manner, the gear 30 may continue to rotate about the shaft 31 while said shaft remains stationary. Before the tractor engine is started, the clutch member 35 should be disengaged from the clutch member 34 if the power take-off shaft 31 is connected to machinery to be operated thereby. The complementary overload release clutch members 34 and 35 may yield and the gear 30 continue to rotate without damaging any of the parts even when the take-off shaft 31 is stopped from any cause, as when the combine pulled by the tractor becomes full of or choked by unthreshed grain.

The forward end of the shaft 31 is arranged to drive a belt pulley shaft 43 by gearing 44. The shaft 43 extends laterally to one side of the tractor and may be equipped with the usual or any known type of belt pulley (not shown).

From the foregoing, it is clear that the power take-off shaft 31 may be rotated independently of the transmission shaft 2, 3 and while the tractor remains stationary or in motion. The longitudinally movable rotary shaft 19, 20 may be rotated directly by the shaft 1 of the engine or by the shaft 2, as desired. This optional selection of the means for rotating the shaft 19, 20 is effected by operation of the lever 26 to move said shaft longitudinally to engage the clutch member 22 thereon with the clutch member 23 or the clutch member 24, as desired. Thus, the driving mechanism for the take-off shaft may be operated at the same speed as the transmission shaft that propels the tractor, or at a different speed, as desired. The construction, arrangement and cooperative relationship of the parts may be varied within the scope of equivalent limits without departure from the nature and principle of the invention.

I claim:

1. In a tractor having a transmission drive shaft, and a power driven shaft for driving the same; a rotary power take-off shaft supported by the tractor, a longitudinally shiftable rotary shaft mounted concentrically with said transmission shaft, means for rotating said last named shaft when in one of its longitudinal positions by said transmission shaft and by said power shaft when in another of its longitudinal positions, and gearing for rotating said power take-off shaft by said last named shaft while said transmission shaft is rotating or stationary.

2. In a tractor having a transmission drive shaft, and mechanism for driving the same; a rotary power take-off shaft supported by the tractor, a shaft mounted concentric with said drive shaft for rotation thereby during operation of said drive shaft by said mechanism or independently of said drive shaft by said mechanism means for rotating said third shaft by said drive shaft, means for rotating said third shaft independently of said drive shaft, and gearing for rotating said power take-off shaft by said third shaft.

3. In a tractor having a transmission drive shaft, and mechanism for driving the same; a rotary power take-off shaft supported by the tractor, a shaft concentric with said transmission shaft for driving said take-off shaft, and mechanism for rotating said concentric shaft by said transmission shaft during rotation of said transmission shaft by said driving mechanism or independently of said transmission shaft as desired.

4. In a tractor having a transmission drive shaft, and mechanism for driving the same; a rotary power take-off shaft supported by the tractor, a gear on and rotative independently of said take-off shaft, mechanism for rotating said gear by said transmission drive shaft or not as desired, a disengageable overload release clutch for driving said take-off shaft by said gear, and means to hold said escapement clutch disengaged.

5. In a tractor having a transmission drive shaft, a power driven shaft, and clutch mechanism for rotating said transmission shaft by said power driven shaft or not as desired; a power take-off shaft rotatively supported by the tractor, a rotary shaft movable longitudinally to a position for rotation by said drive shaft and to another position for rotation by said power shaft as desired, and mechanism for rotating said power take-off shaft by said rotary shaft in either of said positions.

6. In a tractor having a transmission drive shaft, a power driven shaft, and clutch mechanism for driving said transmission shaft by said power driven shaft; an inner shaft supported concentrically with said transmission shaft, a rotary power take-off shaft supported by the tractor and driven directly by said inner shaft and independently of said transmission shaft, means for rotating said inner shaft by said transmission shaft or by said power shaft as desired, and means for engaging and disengaging said clutch mechanism and thereby controlling the starting and stopping of the tractor during continuous rotation of said take-off shaft.

7. In a tractor having a transmission drive shaft, a power driven shaft for driving the same, and a clutch mechanism controlling operation of said transmission shaft by said power driven shaft; a rotary power take-off shaft supported by the tractor, a rotary shaft mounted concentrically with said transmission shaft, and mechanism for driving said last named shaft by said transmission shaft during operation of said transmission shaft by said power driven shaft or directly by said power driven shaft as desired.

8. In a tractor having a transmission drive shaft, a power driven shaft for driving the same, and a clutch mechanism controlling operation of said transmission shaft by said power driven shaft; a rotary power take-off shaft supported by the tractor parallel with said transmission shaft, a rotary shaft mounted concentrically with said transmission shaft, and mechanism for rotating said last named shaft by said transmission shaft and at the same speed during operation of said transmission shaft by said power driven shaft, or independently of said transmission shaft during rotation of the latter and at different speeds, as desired.

9. In a tractor, a power shaft, a power take-off shaft, a transmission shaft, a friction clutch for rotating said transmission shaft by the power shaft, a rotating shaft mounted concentrically with said transmission shaft, means for driving said rotating shaft by said power shaft or by said transmission shaft as desired, means for disengaging said friction clutch and thereby leaving the transmission shaft free to stop while said rotary shaft continues rotating with said power and said driving power take-off shaft.

10. In a tractor, a power shaft, a power take-off shaft, gearing to drive the tractor, gearing to drive the power take-off shaft, a friction clutch rotated by said power shaft, two transmission shafts concentric with each other, the outer shaft of which is driven by said friction clutch to rotate the tractor drive gearing and the inner shaft of which is driven optionally by said power shaft or by said outer shaft to rotate the power take-off gearing and power take-off shaft.

11. In a tractor, a power shaft, a power take-off shaft for driving machinery drawn by the tractor, two transmission shafts concentric with each other, a friction clutch for rotating the outer one of said transmission shafts by said power shaft, clutches for rotating the inner one of said transmission shafts by said outer transmission shaft or directly by said power shaft, gearing for rotating said power take-off shaft by said inner transmission shaft, and means for shifting said inner transmission shaft longitudinally to engage and disengage said respective clutches as desired.

12. In a tractor, a power shaft, a tubular transmission shaft axially alined with said power shaft to drive the tractor, a rotary shaft mounted within the tubular shaft for relative rotation, a jaw clutch element on the forward end of said rotary shaft, means for shifting said rotary shaft longitudinally to engage said clutch element with said power shaft or with said tubular shaft as desired, a friction clutch for rotating said tubular shaft by said power shaft and thereby rotating said rotary shaft with said tubular shaft when said clutch element is engaged therewith, a power take-off shaft for operating machinery connected with the tractor, gearing for driving said take-off shaft by said rotary shaft, an overload release clutch device connecting said gearing with said take-off shaft and leaving said take-off shaft free to stop when overloaded, and means for holding said escapement clutch out of engagement when desired.

13. In a tractor, a power shaft, a tubular transmission shaft axially alined with said power shaft, a friction clutch to rotate said transmission shaft by said power shaft, gearing on said transmission shaft to propel the tractor, a rotary shaft mounted concentrically with said transmission shaft to drive machinery other than the tractor, and means for connecting said rotary shaft to said power shaft for rotation thereby or to said transmission shaft for rotation by the latter.

14. In a tractor, a power shaft, a tubular transmission shaft, a friction clutch to rotate said transmission shaft by said power shaft, gearing on said transmission shaft to propel the tractor, a rotary shaft mounted concentrically with said transmission shaft to drive machinery drawn by the tractor, means to connect said rotary shaft to the power shaft for rotation thereby, means to disengage said friction clutch to leave the transmission shaft free to stop and the tractor itself while said rotary shaft continues to rotate with the power shaft uninterruptedly, and means for shifting said rotary shaft from connection with said power shaft to connection with said transmission shaft so that said friction clutch controls the rotating and stopping of both said shafts simultaneously.

15. In a tractor, a power shaft, a tubular transmission shaft axially alined with said power shaft, a friction clutch to rotate said transmission shaft by said power shaft, a rotary shaft concentric with said transmission shaft to drive machinery connected with the tractor, a second clutch at the front end of said rotary shaft to connect for rotation with either said power shaft or said transmission shaft, and means for shifting said second clutch to disconnect from one and connect to the other one of said shafts.

16. In a tractor having a power shaft; transmission apparatus operative by said power shaft for driving the tractor, a power take-off shaft supported by the tractor for driving machinery connected with the tractor, means for optionally rotating said power take-off shaft by the power shaft or by said transmission apparatus as desired, a disengageable overload release slip clutch on and controlling operation of said take-off shaft and leaving said take-off shaft unoperated when the machinery driven thereby is overloaded, and means for holding said clutch disengaged during the starting of the power shaft.

17. In a tractor having a power shaft; a tubular transmission shaft to drive the tractor, means to rotate said transmission shaft by the power shaft, a rotary shaft concentric with said transmission shaft and rotated by the power shaft, a power take-off shaft for driving machinery other than the tractor itself, gears for rotating said take-off shaft by the said rotary shaft, an overload release clutch on one of said gears and on the take-off shaft, means to hold said clutch engaged, and settable means to hold said clutch disengaged.

18. In a tractor having a rotary power shaft, a fly wheel attached to said power shaft, a tubular shaft axially alined with said power shaft, a friction clutch engaged with said tubular shaft and shiftable to and from position to cooperate with said fly wheel to drive said tubular shaft from said power shaft or leave said tubular shaft unoperated as desired, and tractor driving gearing operated by said tubular shaft; a longitudinally shiftable shaft concentric with said tubular shaft, means for shifting said shiftable shaft longitudinally, a clutch member on said shiftable shaft arranged to engage with said tubular shaft in one position of said shiftable shaft and to engage with said power shaft in another position of said shiftable shaft, a power take-off shaft, gears for rotating said take-off shaft by said shiftable shaft, an overload release clutch controlling operation of said take-off shaft by said shiftable shaft, and optional means for disengaging and holding said clutch disengaged.

EMIL F. STUMPF.